(12) United States Patent
Mahato et al.

(10) Patent No.: US 11,015,540 B2
(45) Date of Patent: May 25, 2021

(54) SYSTEMS AND METHODS FOR IN-CYLINDER FUEL DOSING FOR EXHAUST AFTERTREATMENT SYSTEM THERMAL MANAGEMENT

(71) Applicant: CUMMINS INC., Columbus, IN (US)

(72) Inventors: Chandan Mahato, Columbus, IN (US); John L. Hoehne, Columbus, IN (US); E. Nathan Linen, Columbus, IN (US); Shounak Mishra, Kokomo, IN (US); Boopathi S. Mahadevan, Columbus, IN (US); Foy C. Henderson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/339,634

(22) PCT Filed: Oct. 3, 2017

(86) PCT No.: PCT/US2017/054909
§ 371 (c)(1),
(2) Date: Apr. 4, 2019

(87) PCT Pub. No.: WO2018/067543
PCT Pub. Date: Apr. 12, 2018

(65) Prior Publication Data
US 2020/0049084 A1    Feb. 13, 2020

Related U.S. Application Data

(60) Provisional application No. 62/405,542, filed on Oct. 7, 2016.

(51) Int. Cl.
*F02D 41/02* (2006.01)
*B01D 53/94* (2006.01)
(Continued)

(52) U.S. Cl.
CPC ....... *F02D 41/024* (2013.01); *B01D 53/9431* (2013.01); *B01D 53/9477* (2013.01);
(Continued)

(58) Field of Classification Search
CPC ............ B01D 53/9431; B01D 53/9477; B01D 53/9495; B01D 2255/20723;
(Continued)

(56) References Cited

U.S. PATENT DOCUMENTS 5,848,529 A    12/1998    Katoh et al.
6,647,712 B2   11/2003    Hiller et al.
(Continued)

FOREIGN PATENT DOCUMENTS

CN    101042085    9/2007
CN    101089381    12/2007
(Continued)

OTHER PUBLICATIONS

Office Action from corresponding Chinese Application No. 2017800620877, dated Sep. 4, 2019, pp. 1-7.
(Continued)

*Primary Examiner* — Audrey K Bradley
*Assistant Examiner* — Dapinder Singh
(74) *Attorney, Agent, or Firm* — Foley & Lardner LLP

(57) ABSTRACT

An apparatus comprises a first circuit and a second circuit. The first circuit is structured to determine that a combustion cylinder is operating in a transition period between an exhaust stroke and an intake stroke of the combustion cylinder. The second circuit is structured to provide an injection command during the transition period to a fuel injector associated with the combustion cylinder, the injection command being to inject fuel into a combustion chamber of the combustion cylinder such that at least a portion of the fuel escapes from the combustion chamber through an exhaust port of the combustion cylinder.

20 Claims, 9 Drawing Sheets

(51) Int. Cl.

| | |
|---|---|
| *F01N 3/20* | (2006.01) |
| *F01L 1/047* | (2006.01) |
| *F02B 9/04* | (2006.01) |
| *F02D 13/02* | (2006.01) |
| *F02D 41/00* | (2006.01) |
| *F02D 41/30* | (2006.01) |
| *F02D 41/40* | (2006.01) |
| *F01L 9/20* | (2021.01) |

(52) U.S. Cl.
CPC .......... *B01D 53/9495* (2013.01); *F01L 1/047* (2013.01); *F01L 9/20* (2021.01); *F01N 3/2033* (2013.01); *F02B 9/04* (2013.01); *F02D 13/0203* (2013.01); *F02D 41/009* (2013.01); *F02D 41/3064* (2013.01); *F02D 41/40* (2013.01); *B01D 2255/20723* (2013.01); *B01D 2255/20738* (2013.01); *B01D 2255/20761* (2013.01); *B01D 2255/50* (2013.01)

(58) Field of Classification Search
CPC .......... B01D 2255/20738; B01D 2255/20761; B01D 2255/50; F01L 1/047; F01L 9/04; F01N 3/2033; F01N 3/10; F02B 9/04; F02D 13/0203; F02D 41/009; F02D 41/024; F02D 41/1439; F02D 41/1446; F02D 41/3064; F02D 41/40; F02D 41/402; Y02T 10/18; Y02T 10/26; Y02T 10/44
USPC .................................................... 60/286, 295
See application file for complete search history.

(56) References Cited

U.S. PATENT DOCUMENTS

| | | |
|---|---|---|
| 6,666,020 B2 | 12/2003 | Tonetti et al. |
| 6,718,755 B2 | 4/2004 | Brehob |
| 6,968,831 B2 | 11/2005 | Kim et al. |
| 7,121,254 B2 | 10/2006 | Wickman et al. |
| 7,140,345 B2 | 11/2006 | Gioannini et al. |
| 7,464,690 B1 | 12/2008 | Reitz et al. |
| 8,061,127 B2 | 11/2011 | Guo et al. |
| 2003/0051466 A1 | 3/2003 | Baeuerle et al. |
| 2006/0130463 A1 | 6/2006 | Miura |
| 2009/0007546 A1 | 1/2009 | Ueda et al. |
| 2009/0299610 A1 | 12/2009 | Kumano et al. |
| 2011/0209685 A1* | 9/2011 | Shane .................. F02D 41/064 123/299 |

FOREIGN PATENT DOCUMENTS

| | | |
|---|---|---|
| CN | 102733977 | 10/2012 |
| EP | 2 193 268 | 6/2010 |
| EP | 3 020 944 | 5/2016 |
| WO | WO-2009/037405 | 3/2009 |

OTHER PUBLICATIONS

International Search Report and Written Opinion from corresponding PCT Application No. PCT/US2017/054909, dated Dec. 22. 2017, pp. 1-8.

Supplementary EP Search Report for EP 17859004.8, dated Apr. 28, 2020.

* cited by examiner

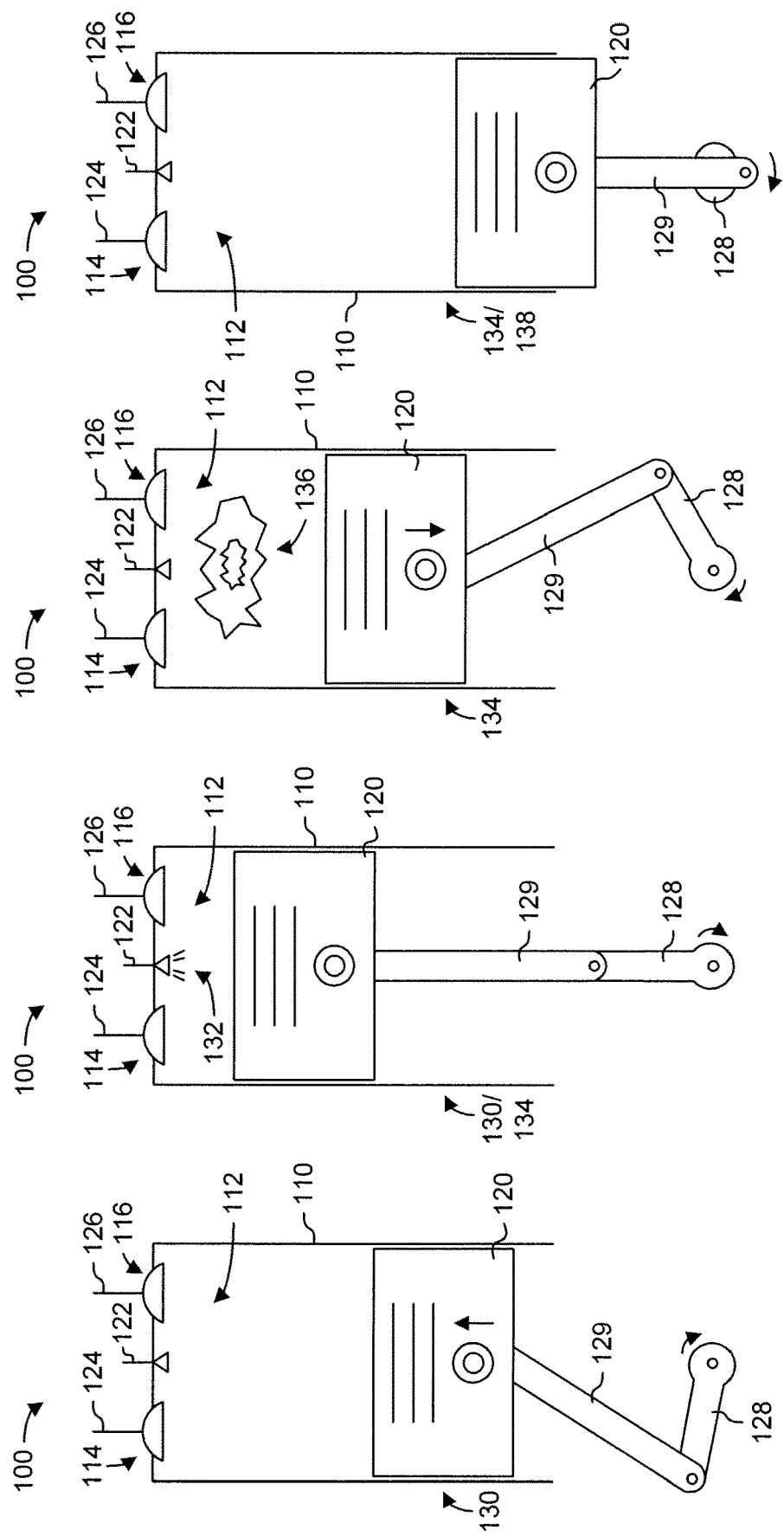

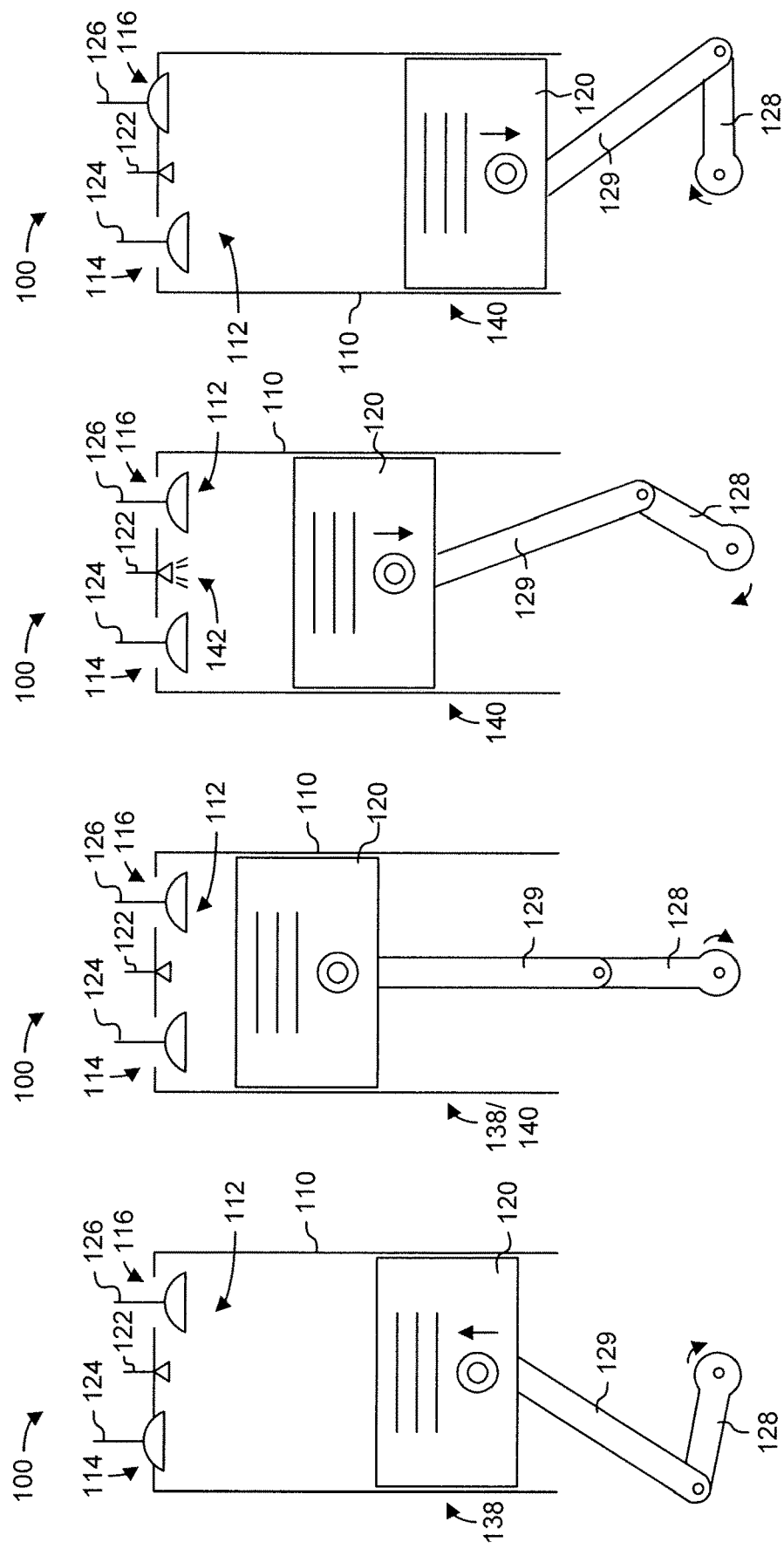

SYSTEMS AND METHODS FOR IN-CYLINDER FUEL DOSING FOR EXHAUST AFTERTREATMENT SYSTEM THERMAL MANAGEMENT

CROSS-REFERENCE TO RELATED APPLICATION

This application is the U.S. national phase of PCT Application No. PCT/US2017/054909, filed Oct. 3, 2017, which claims priority to U.S. Provisional Patent Application No. 62/405,542, filed Oct. 7, 2016, the entire contents of these applications are incorporated by reference herein in their entirety.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing. Exhaust aftertreatment systems are generally designed to reduce emission of particulate matter, nitrogen oxides (NOx), hydrocarbons, and other environmentally harmful pollutants.

SUMMARY

One embodiment relates to an apparatus. The apparatus comprises a first circuit and a second circuit. The first circuit is structured to determine that a combustion cylinder is operating in a transition period between an exhaust stroke and an intake stroke of the combustion cylinder. The second circuit is structured to provide an injection command during the transition period to a fuel injector associated with the combustion cylinder, the injection command being to inject fuel into a combustion chamber of the combustion cylinder such that at least a portion of the fuel escapes from the combustion chamber through an exhaust port of the combustion cylinder.

Another embodiment relates to a method. The method comprises operating an engine according to a combustion cycle. The combustion cycle has an intake stroke, a compression stroke, a power stroke, and an exhaust stroke. The engine comprises a combustion cylinder defining a combustion chamber having an intake port and an exhaust port fluidly coupled to an exhaust aftertreatment system, an intake valve positioned to selectively open the intake port, an exhaust valve positioned to selectively open the exhaust port, a fuel injector, and a piston. According to an example embodiment, the exhaust valve is in an open position during a transition period between the exhaust stroke and the intake stroke. The method further comprises injecting fuel into the combustion chamber during the transition period between the exhaust stroke and the intake stroke such that at least a portion of the fuel escapes from the combustion chamber through the exhaust port.

Another embodiment relates to a system. The system comprises an engine system, a sensor, and a controller. The engine system comprises: a combustion cylinder defining a combustion chamber, an intake port, and an exhaust port; a fuel injector structured to selectively inject fuel into the combustion chamber; an intake valve structured to selectively open the intake port to facilitate drawing air into the combustion chamber through the intake port; an exhaust valve structured to selectively open the exhaust port to facilitate expelling exhaust from the combustion chamber to an exhaust aftertreatment system through the exhaust port; and a piston slidably received within the combustion cylinder. The sensor is structured to acquire data indicative of a crank angle of the piston, the crank angle indicating at least one of a current stroke and a current position of the piston within the combustion chamber, the current stroke including one of an intake stroke, a compression stroke, a power stroke, and an exhaust stroke. The controller is structured to: monitor the crank angle of the piston; determine that the crank angle is within a target angle range, the target angle range being during a transition period between the exhaust stroke and the intake stroke; and provide a command to the fuel injector to inject the fuel into the combustion chamber while the crank angle is within the target angle range such that at least a portion of the fuel escapes from the combustion chamber through the exhaust port.

These and other features, together with the organization and manner of operation thereof, will become apparent from the following detailed description when taken in conjunction with the accompanying drawings.

BRIEF DESCRIPTION OF THE DRAWINGS

FIGS. 2A-2H are various illustrations of a combustion cycle of a combustion cylinder of the engine of FIG. 1, according to an example embodiment.

DETAILED DESCRIPTION

Referring to the Figures generally, the various embodiments disclosed herein relate to systems, methods, and apparatuses for in-cylinder fuel dosing for exhaust aftertreatment thermal management. According to the present disclosure, a controller may control the injection of fuel into a combustion cylinder of an engine to provide in-cylinder fuel dosing for exhaust aftertreatment thermal management. By way of example, the controller may be structured to provide a command to a fuel injector to inject fuel into the combustion chamber during an intake stroke (e.g., a relatively early injection, etc.) while an exhaust valve and an intake valve are both open (i.e., during a valve overlap period between an exhaust stroke and the intake stroke). A portion of the fuel may thereby escape from the combustion chamber while the exhaust valve is open and combust within an exhaust aftertreatment system fluidly coupled to the combustion cylinder (e.g., via an exhaust manifold, etc.). Such an injection strategy may advantageously increase the work output of the engine, increase the operating efficiency of the exhaust aftertreatment system, reduce NOx production, improve fuel economy of the engine, facilitate the removal of and/or reduced use of a reductant dosing system of the exhaust aftertreatment system, and/or prevent liner-spray impingement relative to traditional fuel injection strategies.

Figure 1:
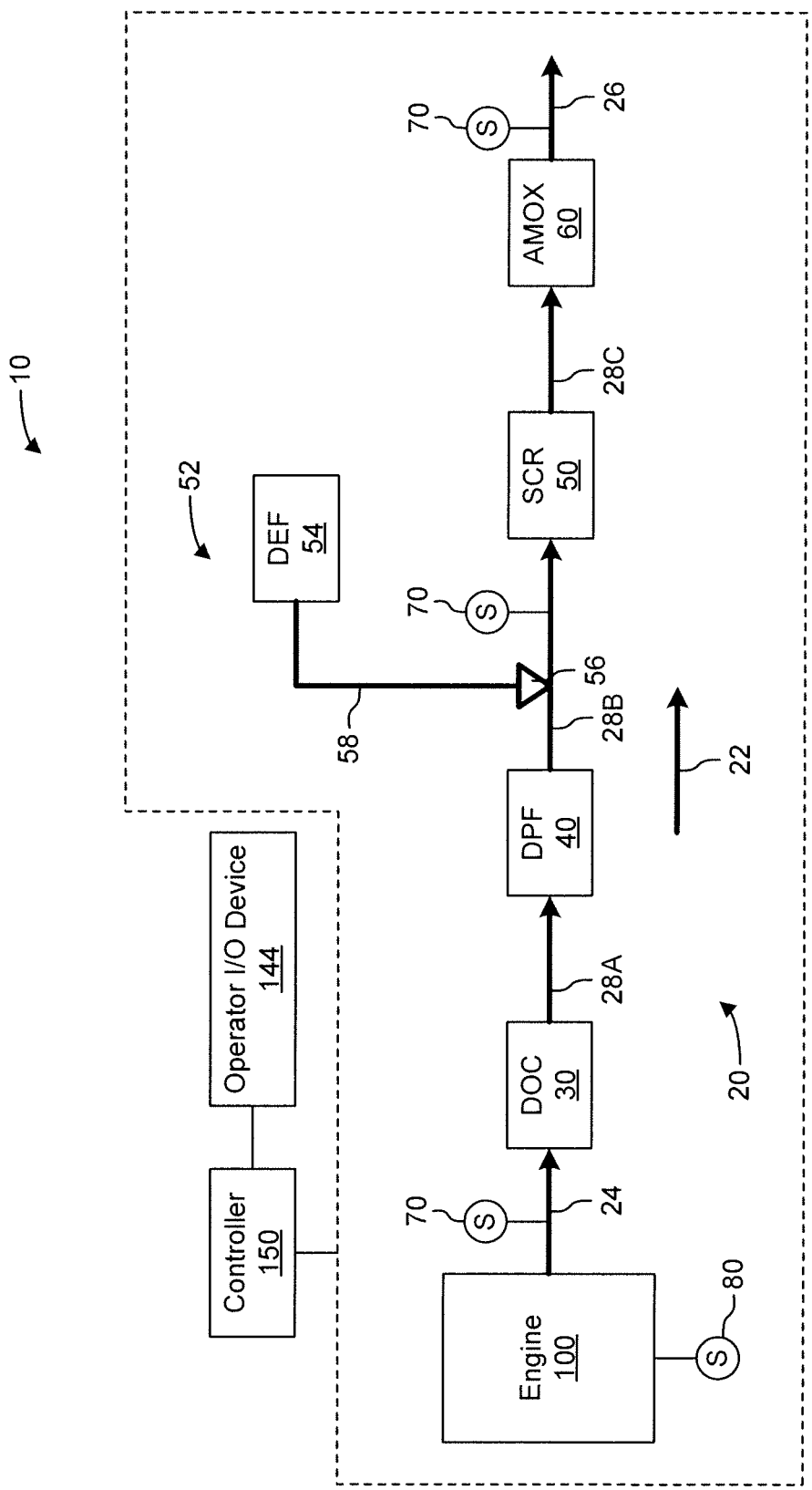
FIG. 1 is a schematic diagram of an engine system with an engine, an exhaust aftertreatment system, and a controller, according to an example embodiment.

Referring now to FIG. 1, an engine system, shown as engine system 10, with a controller 150 is shown, according to an example embodiment. As shown in FIG. 1, the engine system 10 comprises an internal combustion engine, shown as engine 100, and an aftertreatment system, shown as exhaust aftertreatment system 20. The exhaust aftertreatment system 20 is in exhaust gas-receiving communication with the engine 100. According to one embodiment, the engine 100 is structured as a compression-ignition internal combustion engine that uses diesel fuel. However, in various alternate embodiments, the engine 100 may be structured as any other type of engine (e.g., spark-ignition, etc.) that uses any type of fuel (e.g., gasoline, natural gas, etc.). Within the engine 100, air from the atmosphere is combined with fuel, and combusted, to power the engine 100. Combustion of the fuel and air in the compression chambers of the engine 100 produces exhaust gas that is operatively vented to an exhaust manifold and to the exhaust aftertreatment system 20.

In the example depicted, the exhaust aftertreatment system 20 comprises a diesel oxidation catalyst (DOC) 30, a diesel particular filter (DPF) 40, a selective catalytic reduction (SCR) system 52 with an SCR catalyst 50 and an ammonia oxidation (AMOx) catalyst 60. The SCR system 52 further comprises a reductant delivery system that has a reductant source 54, shown as diesel exhaust fluid (DEF) source, that supplies reductant (e.g., DEF, ammonia, etc.) to a reductant doser, shown as DEF doser 56, via a reductant line, shown as DEF line 58. It should be noted that the components of the exhaust aftertreatment system 20 may be in any order, or different components and/or a different aftertreatment architecture may be used. By way of example, the reductant delivery system (e.g., reductant source 54, DEF doser 56, DEF line 58, etc.) may be omitted. By way of another example, the AMOx catalyst 60 may be omitted. In another example, the SCR system 52 may include multiple DEF dosers 56 positioned along the exhaust aftertreatment system 20. Although the exhaust aftertreatment system 20 shown comprises one of a DOC 30, DPF 40, SCR catalyst 50, and AMOx catalyst 60 positioned in specific locations relative to each other along the exhaust flow path, in other embodiments, the exhaust aftertreatment system 20 may include more than one of any of the various catalysts positioned in any of various positions relative to each other along the exhaust flow path as desired. Therefore, the architecture of the exhaust aftertreatment system 20 shown in FIG. 1 is for illustrative purposes and is not limiting.

In an exhaust flow direction, as indicated by directional arrow 22, exhaust gas flows from the engine 100 into inlet piping 24 of the exhaust aftertreatment system 20. From the inlet piping 24, the exhaust gas flows into the DOC 30 and exits the DOC 30 into a first section of exhaust piping 28A. From the first section of exhaust piping 28A, the exhaust gas flows into the DPF 40 and exits the DPF 40 into a second section of exhaust piping 28B. From the second section of exhaust piping 28B, the exhaust gas flows into the SCR catalyst 50 and exits the SCR catalyst 50 into the third section of exhaust piping 28C. As the exhaust gas flows through the second section of exhaust piping 28B, it may be periodically dosed with reductant (e.g., DEF, urea, etc.) by the DEF doser 56. Accordingly, the second section of exhaust piping 28B may act as a decomposition chamber or tube to facilitate the decomposition of the reductant to ammonia. From the third section of exhaust piping 28C, the exhaust gas flows into the AMOx catalyst 60 and exits the AMOx catalyst 60 into outlet piping 26 before the exhaust gas is expelled from the exhaust aftertreatment system 20. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOX catalyst 60. However, in alternative embodiments, other arrangements of the components of the exhaust aftertreatment system 20 are also possible.

The DOC 30 may have any of various flow-through designs. Generally, the DOC 30 is structured to oxidize at least some particulate matter (e.g., the soluble organic fraction of soot) in the exhaust and reduce unburned hydrocarbons and carbon monoxide (CO) in the exhaust to less environmentally harmful compounds. For example, the DOC 30 may be structured to reduce the hydrocarbon and CO concentrations in the exhaust to meet the requisite emissions standards for those components of the exhaust gas. An indirect consequence of the oxidation capabilities of the DOC 30 is the ability of the DOC 30 to oxidize nitric oxide (NO) into nitrogen dioxide ($NO_2$). In this manner, the level of $NO_2$ exiting the DOC 30 is equal to the $NO_2$ in the exhaust gas generated by the engine 100 plus the $NO_2$ converted from NO by the DOC 30.

In addition to treating the hydrocarbon and CO concentrations in the exhaust gas, the DOC 30 may also be used in the controlled regeneration of the DPF 40, the SCR catalyst 50, and the AMOx catalyst 60. This can be accomplished through the injection, or dosing, of unburned hydrocarbons (HC) into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, the SCR catalyst 50, and/or the AMOx catalyst 60. The amount of unburned HC added to the exhaust gas is selected to achieve the desired temperature increase or target controlled regeneration temperature.

The DPF 40 may be any of various flow-through or wall-flow designs, and is structured to reduce particulate matter (e.g., soot and ash) concentrations in the exhaust gas to meet or substantially meet requisite emission standards. The DPF 40 captures particulate matter and other constituents, and thus may need to be periodically regenerated to burn off the captured constituents. Additionally, the DPF 40 may be structured to oxidize NO to form $NO_2$ independent of the DOC 30.

As discussed above, the SCR system 52 may include a reductant delivery system with a reductant (e.g., DEF, etc.) source 54, a pump (not shown), and a delivery mechanism or doser 56. The reductant source 54 can be a container or tank capable of retaining a reductant, such as, for example, ammonia ($NH_3$), DEF (e.g., urea, etc.), or diesel oil. The reductant source 54 is in reductant supplying communication with the pump, which is structured to pump reductant from the reductant source 54 to the doser 56 via a reductant delivery line (e.g., DEF line 58). The doser 56 may be positioned upstream of the SCR catalyst 50. The doser 56 is selectively controllable to inject reductant directly into the exhaust gas stream prior to entering the SCR catalyst 50. In some embodiments, the reductant may either be ammonia or DEF, which decomposes to produce ammonia. The ammonia reacts with NOx in the presence of the SCR catalyst 50 to reduce the NOx to less harmful emissions, such as nitrogen ($N_2$) and water ($H_2O$) (e.g., vapor). The NOx in the exhaust gas stream includes $NO_2$ and NO. Generally, both $NO_2$ and NO are reduced to $N_2$ and $H_2O$ through various chemical reactions driven by the catalytic elements of the SCR catalyst 50 in the presence of $NH_3$.

The SCR catalyst 50 may be any of various catalysts. For example, in some implementations, the SCR catalyst 50 is a vanadium-based catalyst, and in other implementations, the SCR catalyst is a zeolite-based catalyst, such as a copper (Cu)-Zeolite or an iron (Fe)-Zeolite catalyst.

The AMOx catalyst 60 may be any of various flow-through catalysts structured to react with ammonia to produce mainly $N_2$. The AMOx catalyst 60 is structured to remove ammonia that has exited the SCR catalyst 50 without reacting with NOx in the exhaust. In certain instances, the exhaust aftertreatment system 20 may be operable with or without an AMOx catalyst. Further, although the AMOx catalyst 60 is shown as a separate unit from the SCR catalyst 50 in FIG. 1, in some implementations, the AMOx catalyst 60 may be integrated with the SCR catalyst 50 (e.g., the AMOx catalyst 60 and the SCR catalyst 50 may be located within the same housing). According to the present disclosure, the SCR catalyst 50 and the AMOx catalyst 60 are positioned serially, with the SCR catalyst 50 preceding the AMOx catalyst 60 in the direction of exhaust flow (as indicated by directional arrow 22). As described above, in various other embodiments, the AMOx catalyst 60 is not included in the exhaust aftertreatment system 20.

Referring still to FIG. 1, the exhaust aftertreatment system 20 may include one or more aftertreatment system sensors 70, such as NOx sensors, oxygen sensors, temperature sensors, reductant sensors, pressure sensors, flow rate sensors, particulate matter sensors, and so on. The aftertreatment system sensors 70 may be strategically disposed throughout the exhaust aftertreatment system 20 and may be in communication with the controller 150 to monitor operating conditions of the engine system 10, such as operating conditions of the exhaust aftertreatment system 20 and/or the engine 100. For example, the aftertreatment system sensors 70 may be positioned along the first section of exhaust piping 28A, along the second section of exhaust piping 28B, along the third section of exhaust piping 28C, along the inlet piping 24, and/or along the outlet piping 26, among many other possible locations.

By way of example, one or more temperature sensors may be included within the engine system 10. The temperature sensor(s) may be structured to acquire temperature data at different sections of the exhaust piping of the exhaust aftertreatment system 20. By way of example, the temperature sensor(s) may be strategically positioned on, or before and/or after, any component within the engine system 10 (e.g., the engine 100, the DOC 30, the DPF 40, the SCR catalyst 50, the AMOx catalyst 60, couplings, exhaust piping 28A, 28B, 28C, inlet piping 24, outlet piping 26, etc.) such that the temperature of the exhaust gas flowing into and out of any component may be detected and communicably transmitted to the controller 150. In another example, one or more particulate matter (PM) sensors may be included along the exhaust piping 28A, 28B, 28C of the exhaust aftertreatment system 20, or along the inlet piping 24 or the outlet piping 26. The PM sensor(s) may be structured to acquire data indicative of an amount of particulate matter flowing through the exhaust aftertreatment system 20. The PM sensors may be strategically positioned before and/or after any component within the exhaust aftertreatment system 20 such that the particulate matter of the exhaust gas flowing into and out of any component may be detected and communicably transmitted to the controller 150. In still another example, one or more NOx sensors may be included along the exhaust piping 28A, 28B, 28C of the exhaust aftertreatment system 20, or along the inlet piping 24 or the outlet piping 26. The NOx sensor(s) may be structured to acquire data indicative of an amount of NOx flowing through the exhaust aftertreatment system 20. The NOx sensors may be strategically positioned before and/or after any component within the exhaust aftertreatment system 20 such that the NOx of the exhaust gas flowing into and out of any component may be detected and communicably transmitted to the controller 150.

In some embodiments, one or more of the aftertreatment system sensors 70 are virtual sensors. By way of example, the aftertreatment system sensors 70 may include a virtual NOx sensor, a virtual temperature sensor, or any other type of virtual sensor desired instead of a physical sensor at the locations shown in FIG. 1 and/or described above. Therefore, it should be understood that one or more of the aftertreatment system sensors 70 may be replaced by virtual sensors in other embodiments. In this regard, the conditions (e.g., temperature, NOx levels, PM levels, etc.) at various locations may be estimated, determined, or otherwise correlated with various operating conditions of the engine 100 and/or exhaust aftertreatment system 20 (e.g., air intake flow rate, fuel flow rate, air-to-fuel ratio, ignition timing, injection timing, exhaust temperature, exhaust pressure, combustion/cylinder temperature, engine speed, engine power, cylinder pressure, etc.). For example, based on the operating conditions of the engine 100, an indicative amount of NOx exiting the engine 100 may be determined. The determination may use a look-up table that correlates various operating conditions with expected conditions (e.g., NOx amounts, temperatures, etc.), which can be based on data determined during testing (e.g., characterization testing). The determination may also utilize any of a model, formula, equation, process, and the like to otherwise determine the expected conditions at various locations without the use of a physical sensor. This embodiment may be beneficial in exhaust aftertreatment system architectures that are positioned in rather tight spaces, such that the electrical circuitry otherwise used to power and establish a communication protocol with the physical sensors may be eliminated. Further, this embodiment may be beneficial from the standpoint that the need to replace faulty sensors may be substantially avoided. In turn, an operator may realize a rather higher uptime for the system than downtime (e.g., in a repair shop, etc.).

Referring now to FIGS. 2A-2H, the engine 100 comprises one or more combustion cylinders (e.g., one, two, three, four, six, eight, ten, twelve, etc. cylinders). A combustion cylinder 110 in various stages during operation is shown by way of example. Each combustion cylinder 110 defines an internal cavity, shown as combustion chamber 112, one or more intake ports 114, and one or more exhaust ports 116. According to an example embodiment, the intake port 114 is fluidly coupled to an air source (e.g., an air intake, etc.) and is structured to facilitate the entry of fresh air into the combustion chamber 112. According to an example embodiment, the exhaust port 116 is fluidly coupled to the exhaust aftertreatment system 20 (e.g., via an exhaust manifold, the inlet piping 24, etc.) and is structured to facilitate the exit of combustion exhaust from the combustion chamber 112 into the exhaust aftertreatment system 20.

As shown in FIGS. 2A-2H, the engine 100 further comprises, for each combustion cylinder 110, one or more intake valves 124 corresponding to the one or more intake ports 114, one or more exhaust valves 126 corresponding to the one or more exhaust ports 116, and one or more fuel injectors 122. The engine 100 further comprises, for each combustion cylinder 110, a piston 120 coupled to an arm of a crankshaft 128 of the engine 100 via a connecting rod 129. As shown in FIGS. 2A-2H, the piston 120 is slidably received within the combustion chamber 112 of the combustion cylinder 110 such that rotation of the crankshaft 128 causes linear translation of the piston 120 within the combustion chamber 112.

According to the example embodiment shown in FIGS. 2A-2H, the fuel injector 122 is positioned and/or structured to facilitate selectively injecting fuel directly into the combustion chamber 112 of the combustion cylinder 110 (i.e., direct injection) to mix with air within the combustion chamber 112. In other embodiments, the fuel injector 122 is positioned and/or structured to facilitate selectively injecting fuel upstream of the intake port 114 (e.g., into a pre-chamber, a swirl chamber, etc.) such that a pre-mixed air-fuel mixture is received by the combustion chamber 112 through the intake port 114.

As shown in FIGS. 2A-2H, the intake valve 124 is positioned and/or structured to facilitate selectively opening and closing the intake port 114 to facilitate drawing air or an air-fuel mixture into the combustion chamber 112 through the intake port 114. The exhaust valve 126 is positioned and/or structured to facilitate selectively opening and closing the exhaust port 116 to facilitate expelling exhaust from the combustion chamber 112 to the exhaust aftertreatment system 20 through the exhaust port 116 after the air-fuel mixture undergoes combustion. In some embodiments, the intake valve 124 and/or the exhaust valve 126 are mechanically operated valves (e.g., actuated via a camshaft of the engine 100, etc.). In some embodiments, the intake valve 124 and/or the exhaust valve 126 are electrically operated valves (e.g., include a motor or solenoid that is controlled by the controller 150, etc.).

As shown in FIGS. 2A-2H, the engine 100 operates according to a combustion cycle (e.g., a four-stroke combustion cycle, etc.). According to the example embodiment shown in FIGS. 2A-2H, the engine 100 operates according to a four-stroke compression ignition combustion cycle (i.e., the engine 100 is a compression-ignition engine). In other embodiments, the engine 100 operates according to a four-stroke spark ignition combustion cycle (i.e., the engine 100 is a spark-ignition engine). In such spark-ignition embodiments, the engine 100 may include a spark plug positioned and/or structured to initiate combustion of the air-fuel mixture within the combustion chamber 112 (e.g., by providing a spark to ignite the air-fuel mixture, etc.). As shown in FIGS. 2A-2H, the combustion cycle of the engine 100 comprises a compression stroke 130, a power stroke 134, an exhaust stroke 138, and an intake stroke 140.

As used herein, the intake stroke 140 of the combustion cycle may be defined by an intake crank angle range of the crankshaft 128 from 360 degrees before top-dead-center ("BTDC") (i.e., the piston 120 is at top-dead-center ("TDC")) to 180 degrees BTDC (i.e., the piston 120 is at bottom-dead-center ("BDC")). The compression stroke 130 of the combustion cycle may be defined by a compression crank angle range of the crankshaft 128 from 180 degrees BTDC (i.e., the piston 120 is at BDC) to zero degrees BTDC (i.e., the piston 120 is at TDC). The power stroke 134 of the combustion cycle may be defined by a power crank angle range of the crankshaft 128 from zero degrees after TDC ("ATDC") (i.e., the piston 120 is at TDC) to 180 degrees ATDC (i.e., the piston 120 is at BDC). The exhaust stroke 138 of the combustion cycle may be defined by an exhaust crank angle range of the crankshaft 128 from 180 degrees ATDC (i.e., the piston 120 is at BDC) to 360 degrees ATDC (i.e., the piston 120 is at TDC).

By way of example, operation of the engine 100 may be as follows. As shown in FIG. 2A, air and/or an air-fuel mixture within the combustion chamber 112 may be compressed during the compression stroke 130 as the piston 120 translates towards TDC. As shown in FIG. 2B, fuel 132 may be injected into the combustion chamber 112 via the fuel injector 122 (e.g., a main fuel injection, etc.) at some point during the compression stroke 130 and/or the power stroke 134 (e.g., advanced fuel injection prior to the piston 120 reaching TDC during the compression stroke 130, retarded injection after the piston 120 passes TDC and enters the power stroke 134, etc.), thereby mixing with the compressed air and/or air-fuel mixture within the combustion chamber 112. As shown in FIGS. 2C-2D, combustion 136 of the air-fuel mixture may occur during the power stroke 134, driving the piston 120 towards BDC.

As shown in FIG. 2E, the exhaust valve 126 may be actuated into an open position (e.g., via the camshaft, in response to receiving a command from the controller 150, etc.) such that combustion gases may be expelled from the combustion chamber 112 to the exhaust aftertreatment system 20 through the exhaust port 116 during the exhaust stroke 138. As shown in FIGS. 2E-2G, the intake valve 124 may be actuated into an open positon from a closed position (e.g., via the camshaft, in response to receiving a command from the controller 150, etc.) during a transition period between the exhaust stroke 138 and the intake stroke 140. As shown in FIGS. 2E-2G, the exhaust valve 126 is maintained in the open position during the transition period between the exhaust stroke 138 and the intake stroke 140 such that both the intake valve 124 and the exhaust valve 126 are in the open position during the transition period between the exhaust stroke 138 and the intake stroke 140. The transition period may thereby be referred to as a valve overlap period where both the intake valve 124 and the exhaust valve 126 are in the open position simultaneously.

According to an example embodiment, the valve overlap period between the exhaust stroke 138 and the intake stroke 140 occurs during an overlap range of crank angles of the crankshaft 128. The crank angle of the crankshaft 128 may correspond to a current stroke and/or a current position of the piston 120 within the combustion chamber 112 (e.g., thereby facilitating monitoring when the valve overlap period occurs, etc.). According to an example embodiment, the valve overlap period occurs during the overlap range that comprises crank angles between a first crank angle of about 270 degrees ATDC during the exhaust stroke 138 and a second crank angle of about 270 degrees BTDC during the intake stroke 140.

The actuation of the intake valve 124 into the open position defines the start of the valve overlap period (i.e., the first crank angle of the valve overlap period). The intake valve 124 may be actuated into the open positon (e.g., via the camshaft, the controller 150, etc.) at any crank angle between about 270 degrees ATDC during the exhaust stroke 138 and about 270 degrees BTDC during the intake stroke

140. By way of example, the intake valve 124 may be actuated into the open position at a crank angle corresponding with the crankshaft 128 being 270, 280, 290, 300, 310, 320, 340, 345, 350, 355, 360, etc. degrees ATDC or any angle therebetween during the exhaust stroke 138. By way of another example, the intake valve 124 may be actuated into the open position at a crank angle corresponding with the crankshaft 128 being 270, 280, 290, 300, 310, 320, 330, 340, 345, 350, 355, 360, etc. degrees BTDC or any angle therebetween during the intake stroke 140.

As shown in FIG. 2G, the fuel injector 122 is structured and/or position to facilitate providing a very early injection ("VEI") of fuel 142 into the combustion chamber 112 during the valve overlap period. The amount of the fuel 142 injected (i.e., the VEI) may be substantially less than the amount of the fuel 132 injected (i.e., the main injection). According to an example embodiment, the fuel 142 is injected into the combustion chamber 112 at an injection crank angle. The injection crank angle may be any angle within the valve overlap period (e.g., any angle between about 270 degrees ATDC during the exhaust stroke 138 and about 270 degrees BTDC during the intake stroke 140, etc.). According to an example embodiment, the injection crank angle is between 360 degrees BTDC and 270 degrees BTDC during the intake stroke 140 (e.g., 360, 355, 350, 345, 340, 335, 330, 325, 320, 315, 310, 305, 300, 290, 280, 270, etc. degrees BTDC or any angle therebetween during the intake stoke 140). In some embodiments, the injection crank angle is an angle at which the piston 120 is very close to TDC (e.g., less than 0.5 millimeters away from TDC, an injection crank angle between 360 degrees and 315 degrees BTDC during the intake stroke 140, etc.) during the intake stroke 140. Injecting the fuel 142 while the piston 120 is near TDC may prevent the fuel 142 injected into the combustion chamber 112 from targeting the cylinder wall and washing away an oil film disposed thereon.

According to an example embodiment, at least a portion of the fuel 142 from the VEI escapes from the combustion chamber 112 through the exhaust port 116. The portion of the fuel 142 that escapes through the exhaust port 116 may combust within the exhaust aftertreatment system 20, thereby increasing a temperature of components thereof (e.g., the DOC 30, the DPF 40, the SCR catalyst 50, the AMOx catalyst 60, etc.). Increasing the temperature of the components of the exhaust aftertreatment system 20 may increase the operating efficiency of the exhaust aftertreatment system 20. In some embodiments, at least a portion of the fuel 142 remains within the combustion chamber 112 to facilitate premixed charge compression ignition ("PCCI") during the compression stroke 130. Thereby, the fuel 142 injected by the fuel injector 122 during the valve overlap period (i.e., VEI) may be work producing.

As shown in FIGS. 2G-2H, the exhaust valve 126 may be actuated into a closed position from the open position (e.g., via the camshaft, a command from the controller 150, etc.) after the transition period between the exhaust stroke 138 and the intake stroke 140, thereby ending the valve overlap period. As shown in FIG. 2H, the intake valve 124 is maintained in the open position after the transition period between the exhaust stroke 138 and the intake stroke 140 such that fresh air may continue to enter the combustion chamber 112 through the intake port 114 for the duration of the intake stroke 140 (e.g., for use in the subsequent compression stroke 130 and power stroke 134, etc.). The actuation of the exhaust valve 126 into the closed position defines the end of the valve overlap period (i.e., the second crank angle of the valve overlap period). The exhaust valve 126 may be actuated into the closed positon (e.g., via the camshaft, the controller 150, etc.) after the VEI of the fuel 142. By way of example, the exhaust valve 126 may be actuated into the closed position at a crank angle after the injection crank angle (e.g., corresponding with the piston 120 being 270, 280, 290, 300, 310, 320, 330, 340, 345, 350, 355, etc. degrees BTDC or any angle therebetween during the intake stroke 140).

Referring back to FIG. 1, the engine 100 comprises various engine sensors 80 structured to acquire engine operation data. The engine sensors 80 of the engine 100 may be in communication with the controller 150 such that the controller 150 may monitor the operating conditions of the engine 100 indicated by the engine operation data. By way of example, the engine 100 may include a speed sensor, a crank angle sensor, an oxygen sensor, a torque sensor, temperature sensor(s), pressure sensor(s), and/or flow sensor(s) structured to acquire the engine operation data indicative of the operating conditions (e.g., a crank angle of the crankshaft 128, air intake flow rate, fuel flow rate, air-to-fuel ratio, ignition timing, injection timing, exhaust temperature, exhaust pressure, combustion/cylinder temperature, engine speed, engine power, cylinder pressure, etc.) of the engine 100 and the exhaust exiting the engine 100. According to an example embodiment, the engine sensors 80 include a crank angle sensor structured and/or positioned to acquire crank angle data indicative of a current crank angle of the crankshaft 128. The current crank angle of the crankshaft 128 may correspond with a current stroke and/or a current position of the piston 120 within the combustion chamber 112 of the combustion cylinder 110.

Referring still to FIG. 1, the engine system 10 comprises an operator input/output (I/O) device 144. The operator I/O device 144 is communicably coupled to the controller 150, such that information may be exchanged between the controller 150 and the operator I/O device 144, wherein the information may relate to one or more components of FIG. 1. The operator I/O device 144 allows an operator of the engine system 10 to communicate with the controller 150 and one or more components of the engine system 10 of FIG. 1. For example, the operator I/O device 144 may include, but is not limited to, an interactive display, a touchscreen device, one or more buttons and switches, voice command receivers, etc. In various alternate embodiments, the controller 150 and components described herein may be implemented with non-vehicular applications (e.g., a power generator, etc.). Accordingly, the operator I/O device 144 may be specific to those applications. For example, in those instances, the operator I/O device 144 may include a laptop computer, a tablet computer, a desktop computer, a phone, a watch, a personal digital assistant, etc. Via the operator I/O device 144, the controller 150 may provide a fault notification, a service notification, operational information, and so forth regarding operation of the engine system 10 and the components thereof (e.g., the engine 100, the exhaust aftertreatment system 20, etc.).

The controller 150 is structured to control the operation of the engine system 10 and associated sub-systems, such as the engine 100 and the exhaust aftertreatment system 20. According to an embodiment, the components of FIG. 1 are embodied in a vehicle. The vehicle may include an on-road or an off-road vehicle including, but not limited to, line-haul trucks, mid-range trucks (e.g., pick-up trucks), cars, boats, tanks, airplanes, and any other type of vehicle that uses an exhaust aftertreatment system. In various alternate embodiments, as described above, the controller 150 may be used with any engine-exhaust aftertreatment system (e.g., a stationary power generation system, etc.). Communication between and among the components of the engine system 10 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, Zigbee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Because the controller 150 is communicably coupled to the systems and components of FIG. 1, the controller 150 is structured to receive data from one or more of the components shown in FIG. 1. For example, the data may include the crank angle data acquired by the engine sensor 80, other engine operation data, and/or exhaust aftertreatment system operation data (e.g., acquired by one or more engine sensors 80, the aftertreatment system sensors 70, etc.). The controller 150 may be structured to control operation of the engine system 10 based on the engine operation data and/or the exhaust aftertreatment system operation data, as described further herein.

As the components of FIG. 1 are shown to be embodied in an engine system 10, in one embodiment the controller 150 may be embodied as an electronic control unit (ECU) or an add-on to an ECU. In some embodiments, the controller 150 is included in the ECU of a vehicle. The ECU may include a transmission control unit and any other vehicle control unit (e.g., exhaust aftertreatment control unit, powertrain control circuit, engine control circuit, etc.). In an alternative embodiment, the controller 150 is web based, server based, and/or application based (e.g., a smartphone app, a controller on the internet, etc.). The structure and function of the controller 150 is further described in regard to FIG. 3.

Figure 3:
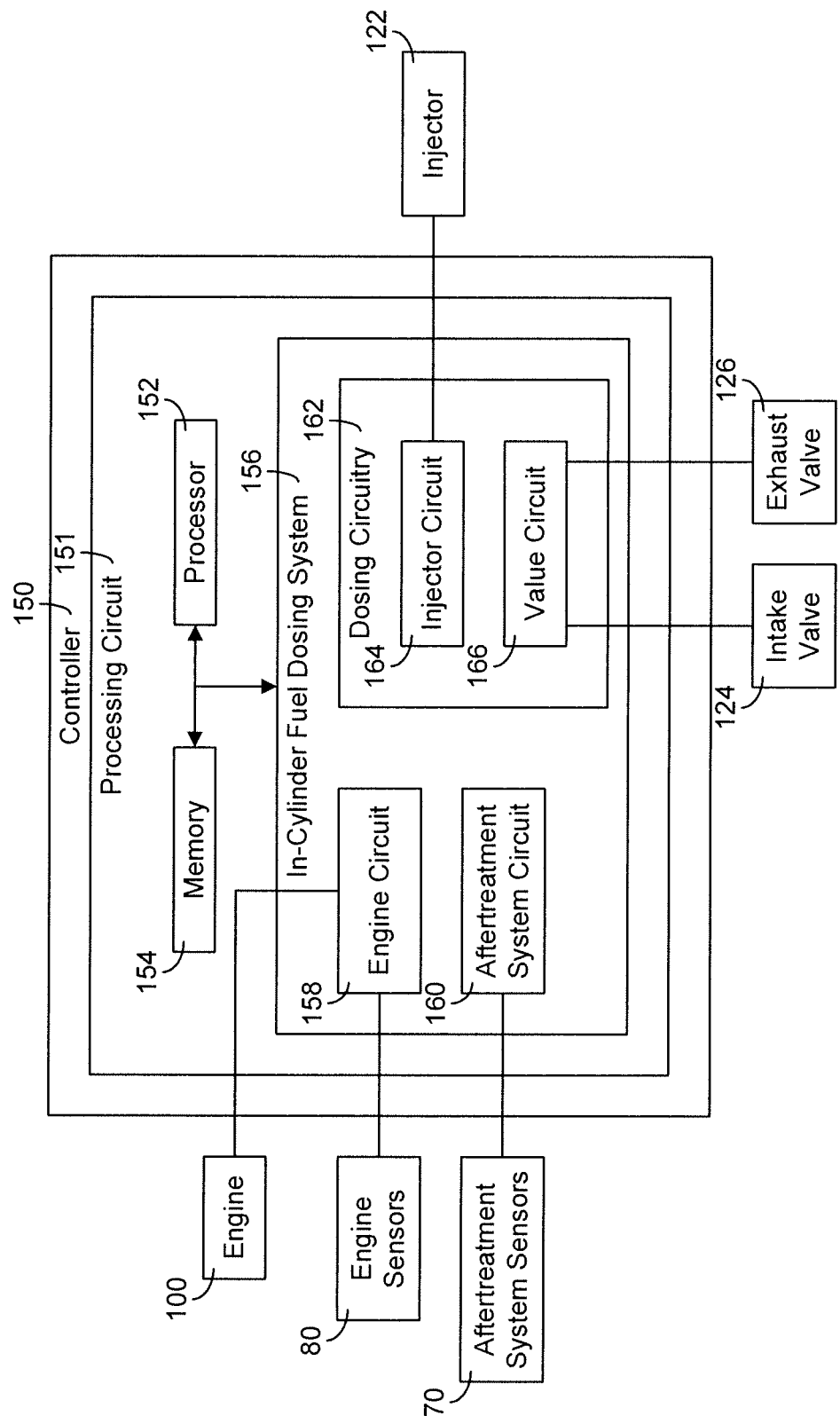
FIG. 3 is a schematic diagram of the controller used with the engine system of FIG. 1, according to an example embodiment.

Referring now to FIG. 3, a schematic diagram of the controller 150 of the engine system 10 of FIG. 1 is shown according to an example embodiment. As shown in FIG. 3, the controller 150 comprises a processing circuit 151. The processing circuit 151 comprises a processor 152, a memory 154, and an in-cylinder fuel dosing system 156. The processor 152 may be implemented as a general-purpose processor, an application specific integrated circuit (ASIC), one or more field programmable gate arrays (FPGAs), a digital signal processor (DSP), a group of processing components, or other suitable electronic processing components. The memory 154 (e.g., RAM, ROM, Flash Memory, hard disk storage, etc.) may store data and/or computer code for facilitating the various processes described herein. The memory 154 may be communicably connected to the processor 152 and the in-cylinder fuel dosing system 156 and structured to provide computer code or instructions to the processor 152 for executing the processes described in regard to the in-cylinder fuel dosing system 156 herein. Moreover, the memory 154 may be or may include tangible, non-transient volatile memory or non-volatile memory. Accordingly, the memory 154 may include database components, object code components, script components, or any other type of information structure for supporting the various activities and information structures described herein.

The in-cylinder fuel dosing system 156 comprises various circuits for completing the activities described herein. More particularly, the in-cylinder fuel dosing system 156 comprises an engine circuit 158, an aftertreatment system circuit 160, and dosing circuitry 162 having an injector circuit 164 and a valve circuit 166. The circuits 158-166 are structured to provide in-cylinder fuel dosing to thermally manage (e.g., regulate, modulate, adjust, increase, etc.) the temperature of the exhaust aftertreatment system 20 and the components thereof (e.g., the DOC 30, the DPF 40, the SCR catalyst 50, the AMOx catalyst 60, etc.). While various circuits with particular functionality are shown in FIG. 3, it should be understood that the controller 150, the in-cylinder dosing system 156, and/or the memory 154 may include any number of circuits for completing the functions described herein. For example, the activities and functionalities of circuits 158-166 may be embodied in the memory 154, or combined in multiple circuits or as a single circuit. Additional circuits with additional functionality may also be included. Further, it should be understood that the controller 150 may further control other activity beyond the scope of the present disclosure.

Certain operations of the controller 150 described herein may include operations to interpret and/or to determine one or more parameters. Interpreting or determining, as utilized herein, comprises receiving values by any method known in the art, including at least receiving values from a datalink or network communication, receiving an electronic signal (e.g., a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The engine circuit 158 may be structured to control operation of the engine 100 and/or receive data regarding the operation of the engine 100 from the engine sensors 80. By way of example, the engine circuit 158 may be structured to receive and interpret the crank angle data from the engine sensors 80 indicative of a current stroke and/or a current position of the piston 120 within the combustion chamber 112. The engine circuit 158 may be further structured to determine the crank angle of the crankshaft 128 is within a target angle range corresponding with the valve overlap period of the intake valve 124 and the exhaust valve 126 (e.g., a range somewhere between 270 degrees ATDC of the exhaust stroke 138 and 270 degrees BTDC of the intake stroke 140, etc.). By way of another example, the engine circuit 158 may be structured to receive and interpret other engine operation data from the engine sensors 80 indicative of various operating characteristics of the engine 100 (e.g., air intake flow rate, fuel flow rate, air-to-fuel ratio, ignition timing, injection timing, exhaust temperature, exhaust pressure, combustion/cylinder temperature, engine speed, engine power, cylinder pressure, etc.). In some embodiments, the engine circuit 158 may be communicably and operatively coupled to the engine 100 and/or the engine sensors 80 to facilitate controlling operation of the engine 100 (e.g., based on the engine operation data, etc.).

According to one embodiment, the engine circuit 158 may include communication circuitry structured to facilitate the exchange of information, data, values, non-transient signals, etc. between and among the engine circuit 158, the dosing circuitry 162, the engine 100, and/or the engine sensors 80.

For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the engine circuit 158 may include communication circuitry including, but not limited to, wired and wireless communication protocol to facilitate reception of the data regarding operation of the engine 100.

In another embodiment, the engine circuit 158 may include machine-readable media stored by the memory 154 and executable by the processor 152, wherein the machine-readable media facilitates performance of certain operations to receive the data regarding the operation of the engine 100. For example, the machine-readable media may provide an instruction (e.g., command, etc.) related to the engine sensors 80 of the engine 100 to acquire the engine operation data. In this regard, the machine-readable media may include programmable logic that defines the frequency of acquisition of the engine operation data. In yet another embodiment, the engine circuit 158 may include any combination of machine-readable content, communication circuitry, or other circuitry related to the engine 100 or the engine sensors 80.

The aftertreatment system circuit 160 may be structured to control operation of the exhaust aftertreatment system 20 and/or receive data regarding the operation of the exhaust aftertreatment system 20 from the aftertreatment system sensors 70. By way of example, the aftertreatment system circuit 160 may be structured to receive and interpret exhaust aftertreatment system operation data from the aftertreatment system sensors 70 indicative of various operating characteristics of the exhaust aftertreatment system 20 (e.g., exhaust temperature, exhaust pressure, exhaust flow rate, NOx amount, PM amount, component temperatures, etc.).

According to an embodiment, the aftertreatment system circuit 160 may include communication circuitry structured to facilitate the exchange of information, data, values, non-transient signals, and so forth between and among the aftertreatment system circuit 160, the dosing circuitry 162, the engine circuit 158, the exhaust aftertreatment system 20, and/or the aftertreatment system sensors 70. For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the aftertreatment system circuit 160 may include communication circuitry including, but not limited to, wired and wireless communication protocol to facilitate reception of the data regarding operation of the exhaust aftertreatment system 20.

In another embodiment, the aftertreatment system circuit 160 may include machine-readable media stored by the memory 154 and executable by the processor 152, wherein the machine-readable media facilitates performance of certain operations to receive the data regarding the operation of the exhaust aftertreatment system 20. For example, the machine-readable media may provide an instruction (e.g., command, etc.) related to the aftertreatment system sensors 70 of the exhaust aftertreatment system 20 to acquire the exhaust aftertreatment system operation data. In this regard, the machine-readable media may include programmable logic that defines the frequency of acquisition of the exhaust aftertreatment system operation data. In yet another embodiment, the aftertreatment system circuit 160 may include any combination of machine-readable content, communication circuitry, the exhaust aftertreatment system 20, and the aftertreatment system sensors 70.

The injector circuit 164 may be communicably coupled to and/or include components of or related to the fuel injector 122. The injector circuit 164 may thereby be structured to control the operation of the fuel injector 122. The injector circuit 164 may be structured to control the operation of the fuel injector 122 based on the engine operation data and/or the exhaust aftertreatment system operation data (e.g., the crank angle data, etc.). For example, the injector circuit 164 may be structured to provide an injection command to the fuel injector 122 to control (i) the timing of the injection of the fuel 132, (ii) the amount of the fuel 132, (iii) the timing of the injection of the fuel 142, and/or (iv) the amount of the fuel 142 injected into the combustion chamber 112 of the combustion cylinder 110.

In some embodiments, the injector circuit 164 is structured to control the injection timing of the fuel 132 during the compression stroke 130 and/or the power stroke 134. By way of example, the injector circuit 164 may be structured to advance or retard the injection timing of the fuel 132 based on the current operating characteristics of the engine 100 and/or the exhaust aftertreatment system 20 (e.g., indicated by the engine operation data, the exhaust aftertreatment system operation data, etc.). Altering the timing of injection may provide desired operating conditions for the engine 100 and/or the exhaust aftertreatment system 20 (e.g., based on the current load on the engine 100, to meet emission regulations, etc.). In some embodiments, the injector circuit 164 is structured to control an amount of the fuel 132 injected during the compression stroke 130 and/or the power stroke 134. By way of example, the injector circuit 164 may be structured to increase or decrease the amount of the fuel 132 injected into the combustion chamber 112 based on the current operating characteristics of the engine 100 and/or the exhaust aftertreatment system 20 (e.g., indicated by the engine operation data, the exhaust aftertreatment system operation data, etc.). Altering the amount of the fuel 132 injected may provide desired operating conditions for the engine 100 and/or the exhaust aftertreatment system 20 (e.g., based on the current load on the engine 100, to meet emission regulations, etc.).

According to an example embodiment, the injector circuit 164 is structured to control the injection timing of the fuel 142 such that the injection of the fuel 142 occurs during the valve overlap period of the intake valve 124 and the exhaust valve 126 (i.e., VEI). By way of example, the injector circuit 164 may be structured to provide a command to the fuel injector 122 to inject the fuel 142 into the combustion chamber 112 while the crank angle of the crankshaft 128 is within the target angle range such that (i) at least a portion of the fuel 142 escapes from the combustion chamber 112 through the exhaust port 116 into the exhaust aftertreatment system 20 (e.g., the fuel injector 122 acts as an in-cylinder fuel dosing system, etc.) and/or (ii) at least a portion of the fuel 142 remains within the combustion chamber 112 to provide PCCI during the subsequent compression stroke 130. According to an example embodiment, the injector circuit 164 is structured to inject the fuel 142 at an injection crank angle between 360 degrees BTDC and 270 degrees BTDC of the intake stroke 140 (e.g., 355, 345, 330, 320, 315, 300, etc. degrees BTDC during the intake stroke 140, etc.). The injector circuit 164 may be structured to adaptively adjust the injection crank angle based on the current operating characteristics of the engine 100 and/or the exhaust aftertreatment system 20 (e.g., indicated by the engine operation data, the exhaust aftertreatment system operation data, etc.). In some embodiments, the injector circuit 164 is structured to inject the fuel 142 at an injection crank angle that corresponds with the piston 120 being near TDC during the intake stroke 140 (e.g., between 360 and 315 degrees BTDC of the intake stroke 140, etc.). Such an injection crank angle may prohibit the fuel 142 from being injected beyond a crank angle that may disadvantageously expose the cylinder wall directly to the fuel spray and wash away an oil film disposed thereon.

According to an example embodiment, the injector circuit 164 is structured to control an amount of the fuel 142 that is injected during the valve overlap period. By way of example, the injector circuit 164 may be structured to increase or decrease the amount of the fuel 142 injected into the combustion chamber 112 based on the current operating characteristics of the engine 100 and/or the exhaust aftertreatment system 20 (e.g., indicated by the engine operation data, the exhaust aftertreatment system operation data, etc.). Altering the amount of the fuel 142 injected may provide desired operating conditions for the engine 100 and/or the exhaust aftertreatment system 20 (e.g., based on the current load on the engine 100, to meet emission regulations, etc.).

According to an embodiment, the injector circuit 164 may include communication circuitry structured to facilitate the exchange of information, data, values, non-transient signals, and so forth between and among the injector circuit 164, the engine circuit 158, the aftertreatment system circuit 160, and/or the fuel injector 122. For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the injector circuit 164 may include communication circuitry including, but not limited to, wired and wireless communication protocol to facilitate reception of the data regarding operation of the exhaust aftertreatment system 20 and/or the engine 100, and/or provide commands to the fuel injector 122 to control the operation thereof.

In another embodiment, the injector circuit 164 may include machine-readable media stored by the memory 154 and executable by the processor 152, wherein the machine-readable media facilitates performance of certain operations to receive the data regarding the operation of the exhaust aftertreatment system 20 and/or the engine 100, and/or provide commands to the fuel injector 122 to control the operation thereof. For example, the machine-readable media may provide an instruction (e.g., command, etc.) related to the fuel injector 122 based on the engine operation data and/or the exhaust aftertreatment system operation data. In this regard, the machine-readable media may include programmable logic that defines when and/or how much fuel (e.g., the fuel 132, the fuel 142, etc.) is injected into the combustion chamber 112. In yet another embodiment, the injector circuit 164 may include any combination of machine-readable content, communication circuitry, and the fuel injector 122.

The valve circuit 166 may be communicably coupled to and/or actively control the operation of the intake valve 124 and the exhaust valve 126 (e.g., when the intake valve 124 and the exhaust valve 126 are electrically operated valves, etc.). The valve circuit 166 may be structured to provide a command to open and/or close the intake valve 124 and the exhaust valve 126 based on the crank angle of the crankshaft 128. By way of example, the valve circuit 166 may be structured to provide a command to open the exhaust valve 126 at the beginning of the exhaust stroke 138 (e.g., at a crank angle of 180 degrees ATDC of the exhaust stroke 138, etc.) and a command to close the exhaust valve 126 at the end of the valve overlap period (e.g., at the second crank angle of the valve overlap period, etc.). By way of another example, the valve circuit 166 may be structured to provide a command to open the intake valve 124 at the beginning of the valve overlap period (e.g., at the first crank angle of the valve overlap period, etc.) and a command to close the intake valve 124 at the end of the intake stroke 140 (e.g., at a crank angle of 180 BTDC during the intake stroke 140, etc.). In some embodiments, the in-cylinder fuel dosing system 156 does not include the valve circuit 166 (e.g., when the intake valve 124 and the exhaust valve 126 are mechanically actuated by a camshaft, otherwise passively controlled, etc.).

Figure 4A:
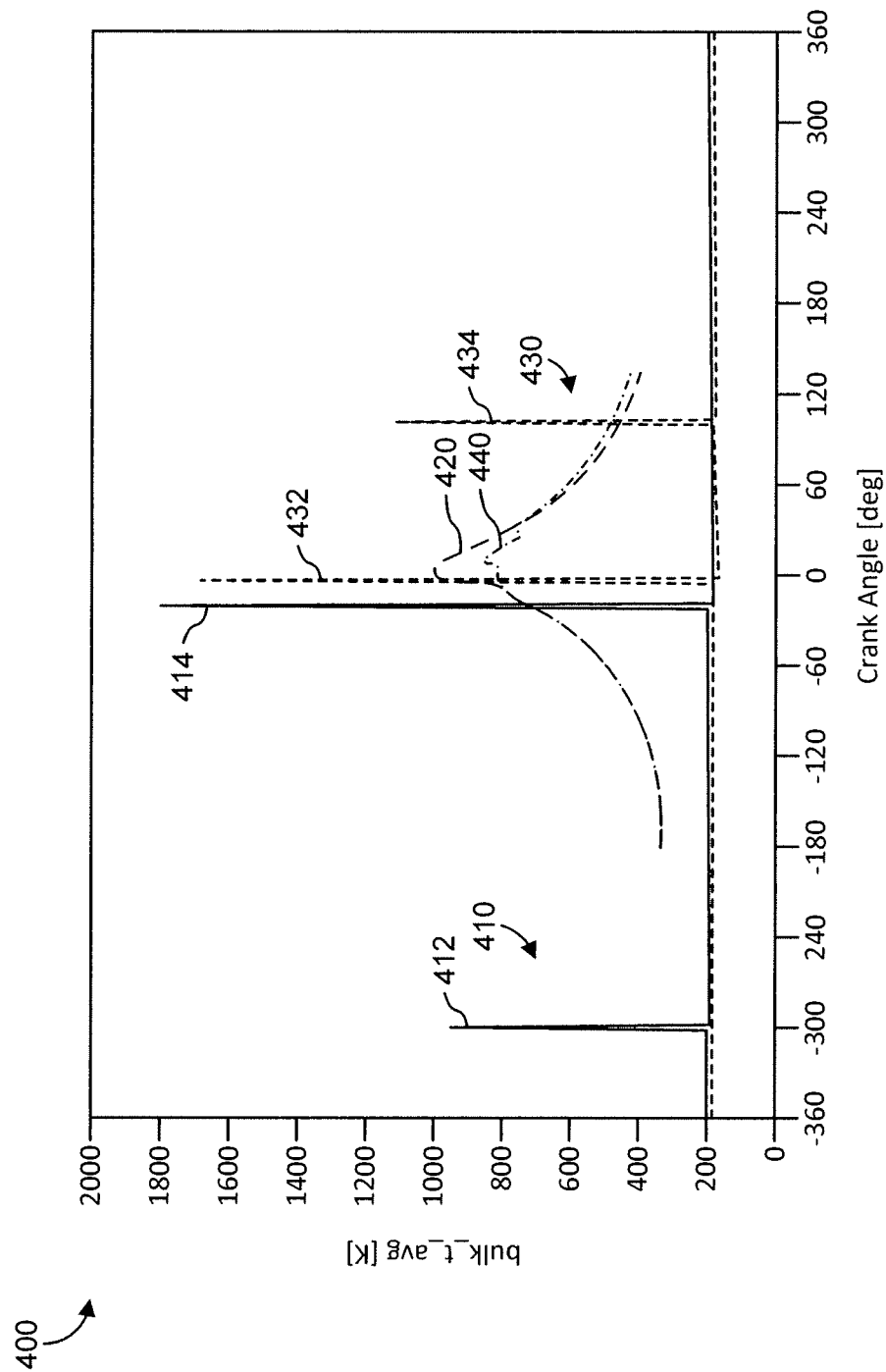
FIG. 4A is a graph illustrating a temperature difference in engine exhaust based on an early fuel injection strategy relative to a late fuel injection strategy, according to an example embodiment.

Referring now to FIG. 4A, a graph 400 illustrating a temperature difference in exhaust temperature based on an early fuel injection strategy (i.e., VEI) relative to a late fuel injection strategy is shown, according to an example embodiment. As shown in FIG. 4A, the graph 400 comprises a first fuel injection profile 410 that provides a first temperature profile 420 and a second fuel injection profile 430 that provides a second temperature profile 440. The first fuel injection profile 410 comprises a VEI 412 (e.g., the injection of the fuel 142, etc.) that occurs during the intake stroke 140 during the valve overlap period (e.g., at 300 degrees BTDC during the intake stroke 140, etc.) and a main injection 414 (e.g., the injection of the fuel 132, etc.) that occurs during the compression stroke 130 and/or the power stroke 134 (e.g., near TDC, etc.). The second fuel injection profile 430 comprises a main injection 432 (e.g., the injection of the fuel 132, etc.) that occurs during the compression stroke 130 and/or the power stroke 134 (e.g., near TDC, etc.) and a late post injection 434 that occurs during the power stroke 134.

The VEI 412 may provide various advantages relative to traditional injection strategies (e.g., late injection strategies, etc.). As shown in FIG. 4A, the first fuel injection profile 410 having the VEI 412 facilitates increasing the temperature of exhaust gases from the combustion of the fuel (e.g., the fuel 132 and/or a portion of the fuel 142, etc.) relative to the second fuel injection profile 430 having the late post injection 434. The increase in the temperature may advantageously provide increased work output of the engine 100 (e.g., the VEI 412 is work producing while the late post injection 434 is not work producing, etc.). The VEI 412 may additionally or alternatively facilitate a portion of the fuel 142 to escape into the exhaust aftertreatment system such that the escaped portion of the fuel subsequently ignites within the exhaust aftertreatment system 20, thereby increasing the component temperatures and the operating efficiencies thereof. The VEI 412 may additionally or alternatively facilitate removing and/or limiting the need for reductant delivery systems within the exhaust aftertreatment system 20 (e.g., by performing in-cylinder dosing with the fuel injector 122, etc.). The VEI 412 may additionally or alternatively enhance fuel-air mixing to achieve various degrees of PCCI. By way of example, a portion of the fuel 142 injected during the VEI 412 may be retained in the combustion chamber 112, which retained fuel interacts with incoming intake air and participates in turbulent fuel-air mixing, resulting in a very lean premixed charge. When the piston 120 enters into the power stroke 134 and the main injection 414 occurs, PCCI type combustion occurs. Such PCCI may reduce NOx production during the combustion process (e.g., by 5-20%, etc.). The VEI 412 may additionally or alternatively improve fuel economy of the engine 100. The VEI 412 may additionally or alternatively be timed such that liner-spray impingement does not occur (e.g., the VEI 412 occurs when the piston 120 is near TDC of the intake stroke 140, etc.). Therefore, the fuel injection strategy of the present disclosure may increase work output of the engine 100, increase the operating efficiency of the exhaust aftertreatment system 20, reduce NOx production, improve fuel economy of the engine 100, facilitate the removal of reductant dosing systems, and/or prevent liner-spray impingement (e.g., relative to traditional fuel injection strategies, etc.).

Figure 4B:
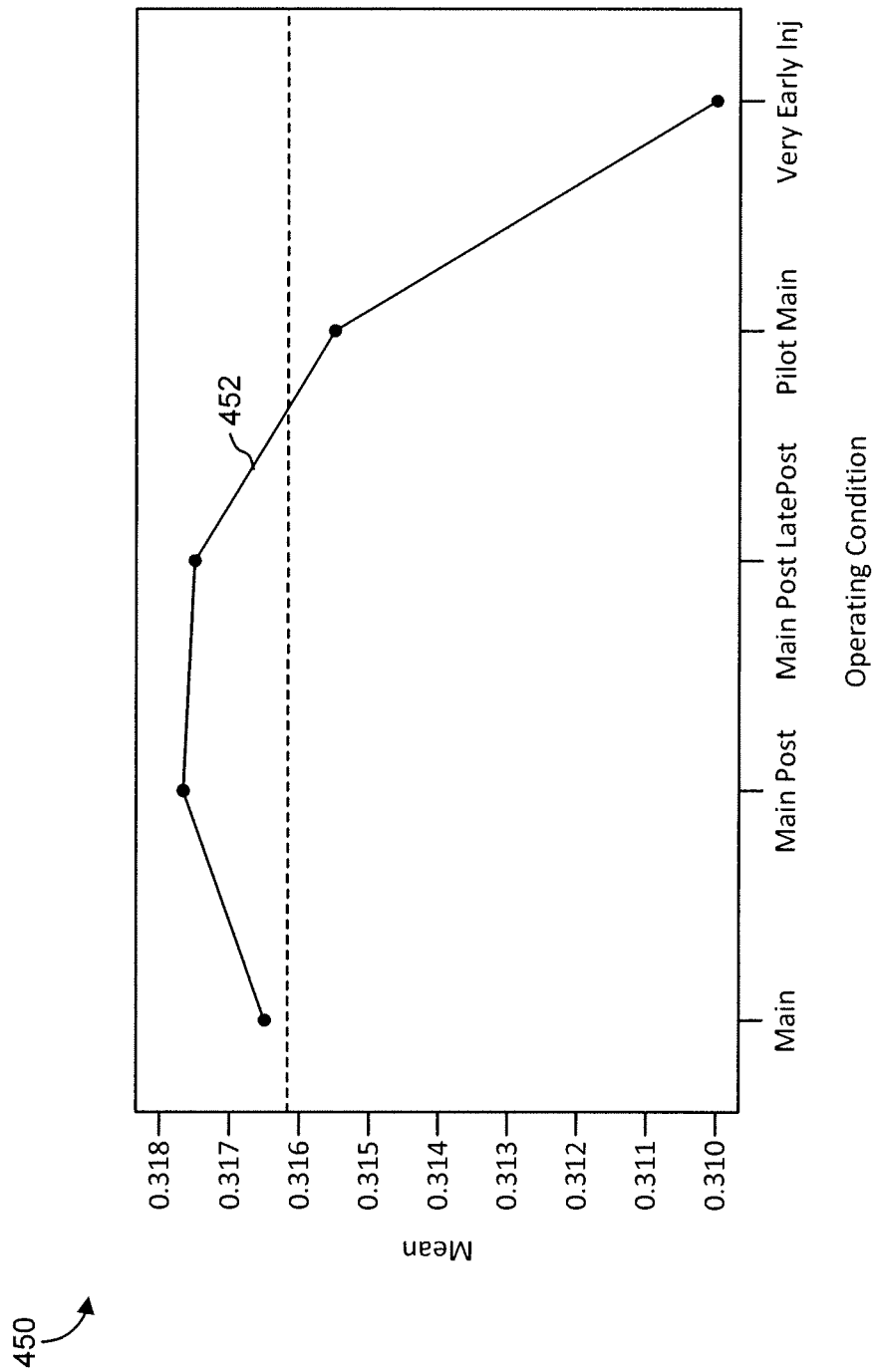
FIG. 4B is a graph illustrating fuel consumption of an engine for various injection strategies, according to an example embodiment.
Figure 4C:
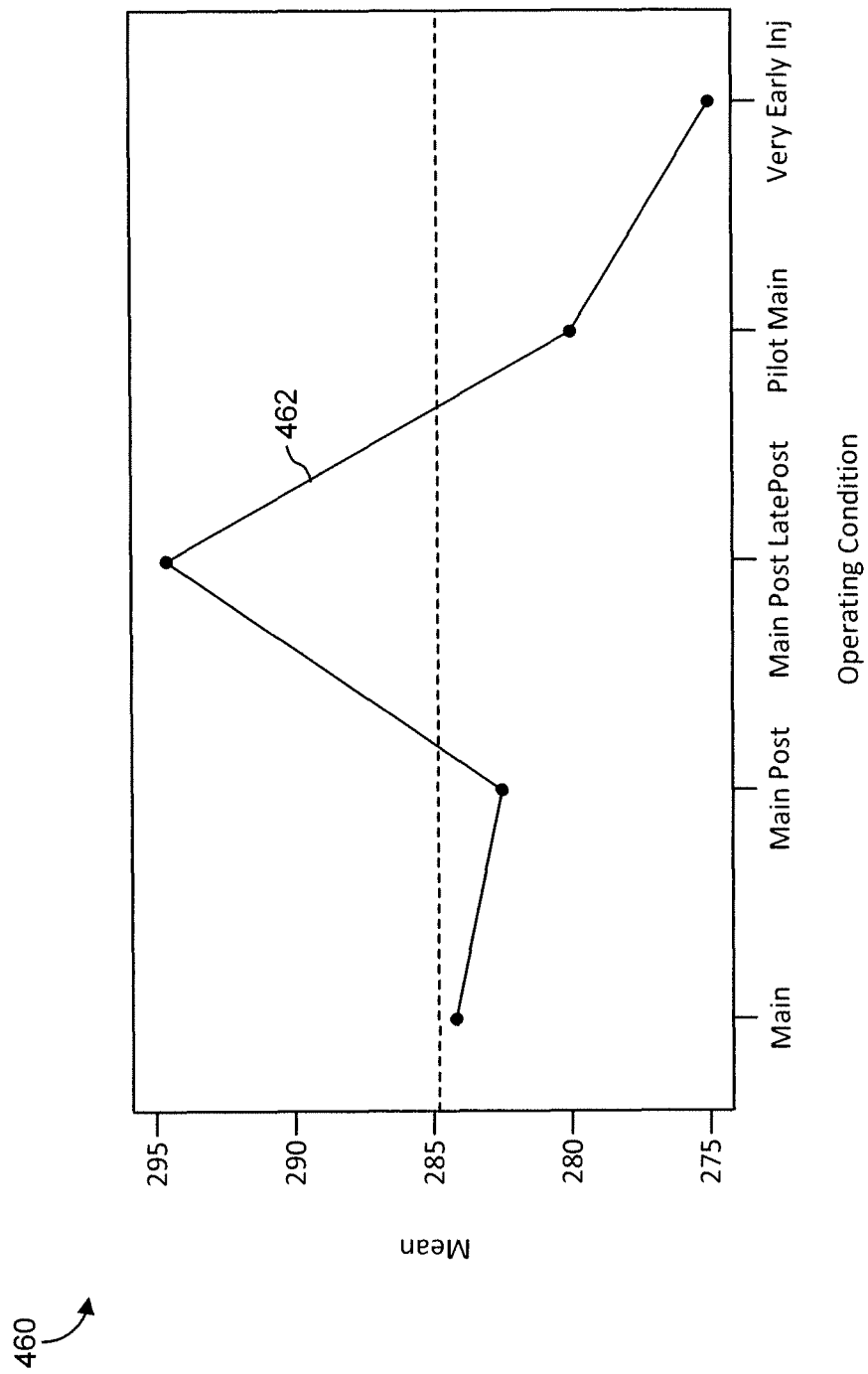
FIG. 4C is a graph illustrating exhaust temperature of an engine for various injection strategies, according to an example embodiment.
Figure 4D:
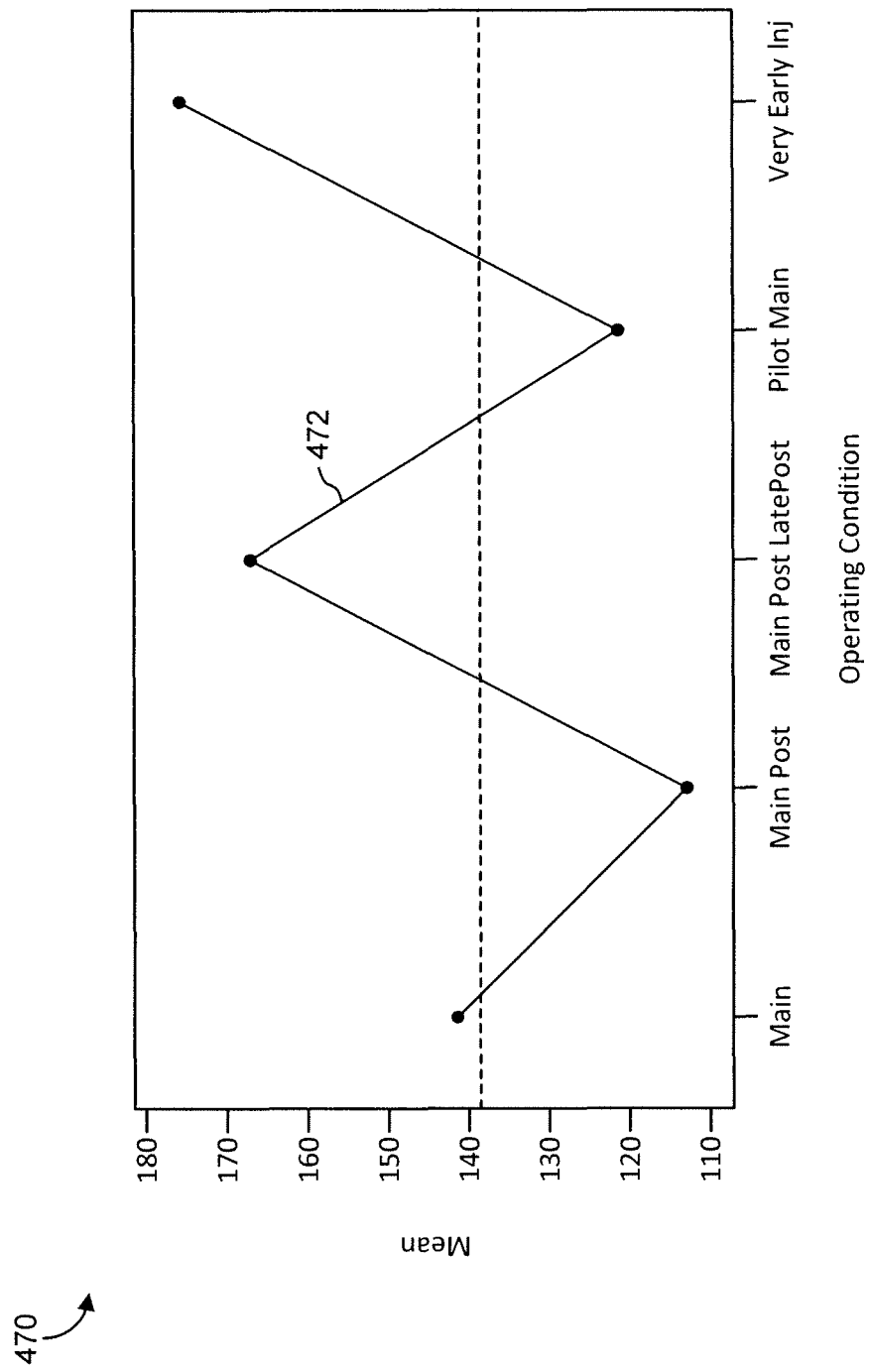
FIG. 4D is a graph illustrating unburned hydrocarbons in exhaust gas of an engine for various injection strategies, according to an example embodiment.

Referring now to FIG. 4B, a graph 450 having a fuel consumption curve 452 illustrating the fuel consumption of an engine (e.g., the engine 100, etc.) for various injection strategies is shown, according to an exemplary embodiment. As shown in FIG. 4B, the fuel consumption curve 452 indicates that the fuel consumption for the engine is the lowest during VEI relative to the other possible injection timing strategies (e.g., very late post injection, etc.). Referring now to FIG. 4C, a graph 460 having an exhaust temperature curve 462 illustrating exhaust temperature for various injection strategies is shown, according to an exemplary embodiment. As shown in FIG. 4C, the exhaust temperature curve 462 indicates that the exhaust gas temperature is the greatest for very late post injection and the lowest for VEI. Referring now to FIG. 4D, a graph 470 having an unburned hydrocarbons curve 472 illustrating the amount of unburned hydrocarbons that escape into an exhaust aftertreatment system (e.g., the exhaust aftertreatment system 20, etc.) from the engine for various injection strategies is shown, according to an exemplary embodiment. As shown in FIG. 4D, the unburned hydrocarbons curve 472 indicates that greater amounts of unburned hydrocarbons are discharged into the exhaust during VET relative to the other injection strategies. The increased amounts of unburned hydrocarbons may be ignited near to or on the catalyst(s) (e.g., the DOC 30, the DPF 40, the SCR catalyst 50, the AMOx catalyst 60, etc.) in a controlled manner to generate additional heat to increase catalyst operation efficiency. Therefore, while the exhaust gas temperature may be lower for VET (e.g., indicated by graph 460, etc.), the engine may operate at an increased fuel efficiency while implementing VET (e.g., indicated by graph 450, etc.), as well as still supply enough unburned hydrocarbons in the exhaust stream (e.g., indicated by graph 470, etc.) for controlled ignition on the catalysts to generate additional heat to compensate for lower exhaust temperatures.

Figure 5:
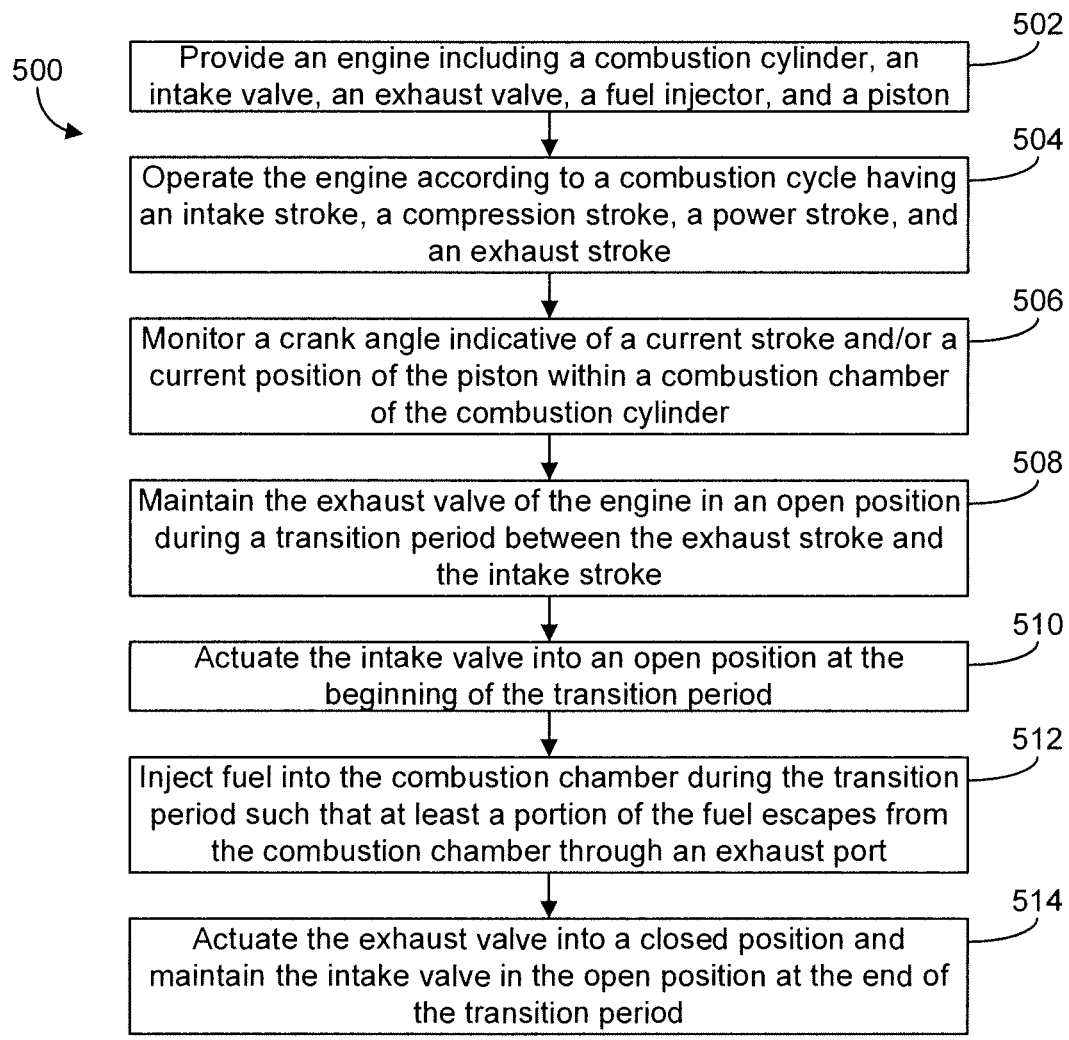
FIG. 5 is a flow diagram of a method for in-cylinder fuel dosing for exhaust aftertreatment system thermal management, according to an example embodiment.

Referring now to FIG. 5, a method 500 for in-cylinder fuel dosing for exhaust aftertreatment system thermal management is shown according to an example embodiment. In an example embodiment, method 500 may be implemented with the controller 150 and the engine 100 of FIGS. 1-3. Accordingly, method 500 may be described in regard to FIGS. 1-3.

At process 502, an engine (e.g., the engine 100, etc.) is provided. The engine may include one or more combustion cylinders (e.g., the combustion cylinder 110; one, two, three, four, six, eight, ten, twelve, etc. cylinders). Each combustion cylinder defines a combustion chamber (e.g., the combustion chamber 112, etc.), an intake port (e.g., the intake port 114, etc.), and an exhaust port (e.g., the exhaust port 116, etc.). The intake port may be fluidly coupled to an air source (e.g., an air intake, etc.) and structured to facilitate the entry of fresh air into the combustion chamber. The exhaust port may be fluidly coupled to an exhaust aftertreatment system (e.g., the exhaust aftertreatment system 20, etc.) and structured to facilitate the exit of combustion exhaust from the combustion chamber into the exhaust aftertreatment system.

The engine may further include an intake valve (e.g., the intake valve 124, etc.), an exhaust valve (e.g., the exhaust valve 126, etc.), a fuel injector (e.g., the fuel injector 122, etc.), and a piston (e.g., the piston 120, etc.) slidably received within the combustion chamber of the combustion cylinder. The fuel injector may be positioned and/or structured to facilitate selectively injecting fuel into the combustion chamber of the combustion cylinder. The intake valve may be positioned and/or structured to facilitate selectively opening the intake port to facilitate drawing air into the combustion chamber through the intake port. The exhaust valve may be positioned and/or structured to facilitate selectively opening the exhaust port to facilitate expelling exhaust from the combustion chamber to an exhaust aftertreatment system through the exhaust port. In some embodiments, the intake valve and/or the exhaust valve are mechanically operated valves (e.g., actuated via a camshaft of the engine 100, etc.). In some embodiments, the intake valve and/or the exhaust valve are electrically operated valves (e.g., include a motor or solenoid that is controlled by the controller 150, etc.).

At process 504, the engine is operated (e.g., by the controller 150, etc.) according to a combustion cycle (e.g., a four-stroke combustion cycle, a four-stroke compression ignition combustion cycle, a four-stroke spark ignition combustion cycle, etc.). The combustion cycle comprises an intake stroke, a compression stroke, a power stroke, and an exhaust stroke. At process 506, a controller (e.g., the controller 150, etc.) is structured to monitor a crank angle (e.g., via the engine sensors 80, via a crank angle sensor of a crankshaft, etc.) indicative of a current stroke and/or a current position of the piston within the combustion chamber of the combustion cylinder.

At process 508, the exhaust valve is maintained in an open position during a transition period or valve overlap period between the exhaust stroke and the intake stroke of the combustion cycle. In some embodiments, the camshaft of the engine is structured to maintain the exhaust valve in the open position during the exhaust stroke and the transition period (e.g., when the exhaust valve is a mechanically actuated valve, etc.). In some embodiments, the controller is structured to maintain the exhaust valve in the open position during the exhaust stroke and the transition period (e.g., when the exhaust valve is an electrically actuated valve, etc.). At process 510, the intake valve is actuated into an open position during (e.g., at the beginning of, etc.) the transition period or valve overlap period between the exhaust stroke and the intake stroke of the combustion cycle. In some embodiments, the camshaft of the engine is structured to actuate the intake valve into the open position during the transition period and the intake stroke (e.g., when the intake valve is a mechanically actuated valve, etc.). In some embodiments, the controller is structured to maintain the intake valve in the open position during the transition period and the intake stroke (e.g., when the intake valve is an electrically actuated valve, etc.). According to an example embodiment, the combustion cycle of the engine thereby comprises a transition period or valve overlap period between the exhaust stroke and the intake stroke where both the intake valve and the exhaust valve are in an open position (e.g., the exhaust valve is maintained in the open position from the immediately preceding exhaust stroke and the intake valve is actuated into the open position at the beginning of the transition period, etc.).

At process 512, the controller is structured to provide a command to the fuel injector to inject fuel into the combustion chamber of the combustion cylinder during the transition period or the valve overlap period such that at least a portion of the fuel injected during the transition period or the valve overlap period escapes from the combustion chamber through the exhaust port into the exhaust aftertreatment system. According to an example embodiment, the portion of the fuel that escapes through the exhaust port combusts within the exhaust aftertreatment system. Such combustion of the fuel within the exhaust aftertreatment system may thereby facilitate thermally managing (e.g., increasing, etc.) the temperature of components of the exhaust aftertreatment system (e.g., the DOC 30, the DPF 40, the SCR catalyst 50, the AMOx catalyst 60, etc.). Increasing the temperature of the components of the exhaust aftertreatment may thereby modulate (e.g., increase, etc.) the operating efficiency thereof. In some embodiments, at least a portion of the fuel remains within the combustion chamber to facilitate premixed charge compression ignition (PCCI) during the compression stroke of the of the combustion cycle, which may reduce in-cylinder NOx production (e.g., by 5-20%, etc.), improve fuel economy, and be work-producing (e.g., relative to late injection strategies that are not work producing, etc.), among other possible advantages. At process 514, (i) the exhaust valve is actuated (e.g., by the controller, by the camshaft, etc.) into a closed position at the end of the transition period or the valve overlap period between the exhaust stroke and the intake stroke of the combustion cycle and (ii) the intake valve is maintained (e.g., by the controller, by the camshaft, etc.) in the open position at the end of the transition period or valve overlap period and during the remainder of the intake stroke.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 152 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the controller 150 of FIGS. 1 and 3), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
   a first circuit structured to determine when a combustion cylinder is operating in a transition period between an exhaust stroke and an intake stroke of the combustion cylinder; and
   a second circuit structured to provide an injection command during the transition period to a fuel injector associated with the combustion cylinder, the injection command being to inject fuel into a combustion chamber of the combustion cylinder such that a portion of the fuel escapes from the combustion chamber through an exhaust port of the combustion cylinder and a remainder of the fuel remains within the combustion chamber.

2. The apparatus of claim 1, wherein an exhaust valve associated with the combustion cylinder is in an open position during the transition period between the exhaust stroke and the intake stroke.

3. The apparatus of claim 2, further comprising a valve circuit structured to selectively actuate the exhaust valve between the open position and a closed position.

4. The apparatus of claim 2, wherein the exhaust valve is actuated between the open position and a closed position by a camshaft of the engine.

5. The apparatus of claim 1, wherein the transition period between the exhaust stroke and the intake stroke is within a range of crank angles of a piston of the combustion cylinder between a first crank angle of about 270 degrees after top-dead-center (ATDC) of the exhaust stroke and a second crank angle of about 270 degrees before top-dead-center (BTDC) of the intake stroke.

6. The apparatus of claim 5, wherein the fuel is injected at an injection crank angle between 360 degrees BTDC and 270 degrees BTDC of the intake stroke.

7. The apparatus of claim 1, wherein the remainder of the fuel facilitates a premixed charge compression ignition during a subsequent compression stroke of the combustion cylinder.

8. A method, comprising:
   operating an engine according to a combustion cycle having an intake stroke, a compression stroke, a power stroke, and an exhaust stroke, wherein the engine comprises a combustion cylinder defining a combustion chamber having an intake port and an exhaust port, the exhaust port fluidly coupled to an exhaust aftertreatment system, an intake valve positioned to selectively open the intake port, an exhaust valve positioned to selectively open the exhaust port, a fuel injector, and a piston, and wherein the exhaust valve is in an open position during a transition period between the exhaust stroke and the intake stroke;
   injecting, by a fuel injector responsive to a command from a processor, fuel into the combustion chamber during the transition period between the exhaust stroke and the intake stroke such that a portion of the fuel escapes from the combustion chamber through the exhaust port and a remainder of the fuel remains within the combustion chamber.

9. The method of claim 8, wherein the portion of the fuel that escapes through the exhaust port combusts within the exhaust aftertreatment system, thereby increasing a temperature of components of the exhaust aftertreatment system.

10. The method of claim 8, wherein the remainder of the fuel facilitates a premixed charge compression ignition.

11. The method of claim 8, further comprising one or both of:
- maintaining the exhaust valve in the open position during the transition period between the exhaust stroke and the intake stroke; and
- actuating the intake valve into the open position at the beginning of the transition period.

12. The method of claim 8, further comprising monitoring, via a sensor, a crank angle indicative of a current stroke and a current position of the piston within the combustion cylinder.

13. The method of claim 12, wherein the transition period between the exhaust stroke and the intake stroke is within a range of crank angles of the piston of the combustion cylinder between a first crank angle of about 270 degrees after top-dead-center (ATDC) of the exhaust stroke and a second crank angle of about 270 degrees before top-dead-center (BTDC) of the intake stroke.

14. The method of claim 13, wherein the fuel is injected into the combustion chamber via the fuel injector at an injection crank angle between 360 degrees BTDC and 270 degrees BTDC of the intake stroke.

15. A system, comprising:
an engine system including:
- a combustion cylinder defining a combustion chamber, an intake port, and an exhaust port;
- a fuel injector structured to selectively inject fuel into the combustion chamber;
- an intake valve structured to selectively open the intake port to facilitate drawing air into the combustion chamber through the intake port;
- an exhaust valve structured to selectively open the exhaust port to facilitate expelling exhaust from the combustion chamber to an exhaust aftertreatment system through the exhaust port; and
- a piston slidably received within the combustion cylinder;
- a sensor structured to acquire data indicative of a crank angle of the piston, the crank angle indicating at least one of a current stroke and a current position of the piston within the combustion chamber, the current stroke including one of an intake stroke, a compression stroke, a power stroke, and an exhaust stroke; and
a controller structured to:
- monitor the crank angle of the piston;
- determine that the crank angle is within a target angle range, the target angle range being during a transition period between the exhaust stroke and the intake stroke; and
- provide a command to the fuel injector to inject the fuel into the combustion chamber while the crank angle is within the target angle range such that a portion of the fuel escapes from the combustion chamber through the exhaust port and a remainder of the fuel remains within the combustion chamber.

16. The system of claim 15, wherein the exhaust valve and the intake valve are in an open position during the transition period.

17. The system of claim 15, wherein the remainder of the fuel facilitates premixed charge compression ignition.

18. The system of claim 15, further comprising a camshaft structured to actuate at least one of the intake valve and the exhaust valve into an open position during the transition period between the exhaust stroke and the intake stroke, wherein the intake valve and the exhaust valve are mechanically operated valves.

19. The system of claim 15, wherein the controller is further structured to provide a command to actuate at least one of the intake valve and the exhaust valve into an open position during the transition period between the exhaust stroke and the intake stroke, wherein the intake valve and the exhaust valve are electrically operated valves.

20. The system of claim 15, wherein the target angle range is within a first crank angle of 360 degrees before top-dead-center (BTDC) and a second crank angle of 270 degrees BTDC of the intake stroke.

* * * * *